May 16, 1961 — C. M. RUSSO — 2,984,317
OIL DRIP CUP FOR KNITTING MACHINES
Filed Aug. 7, 1959
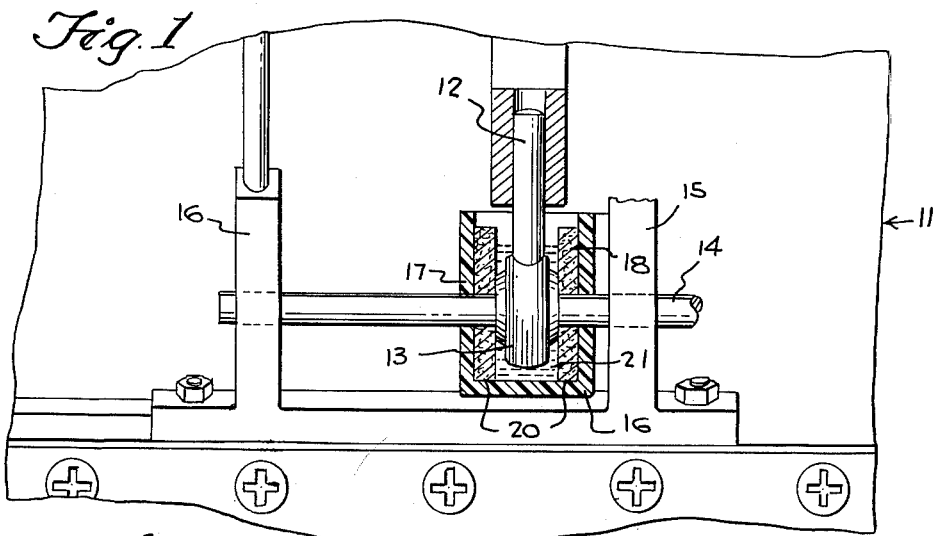
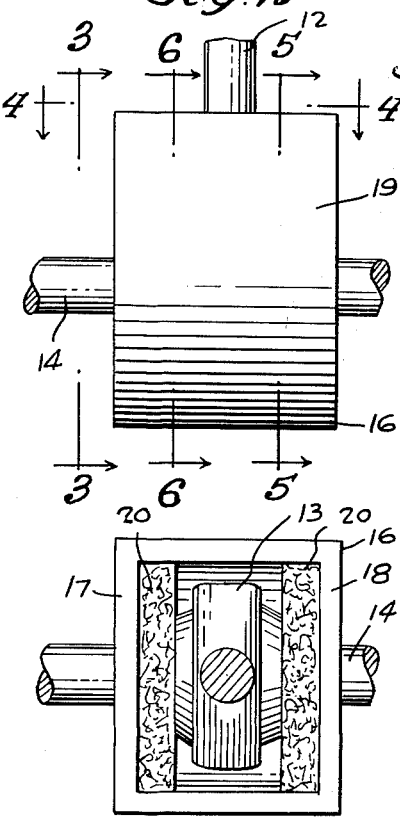
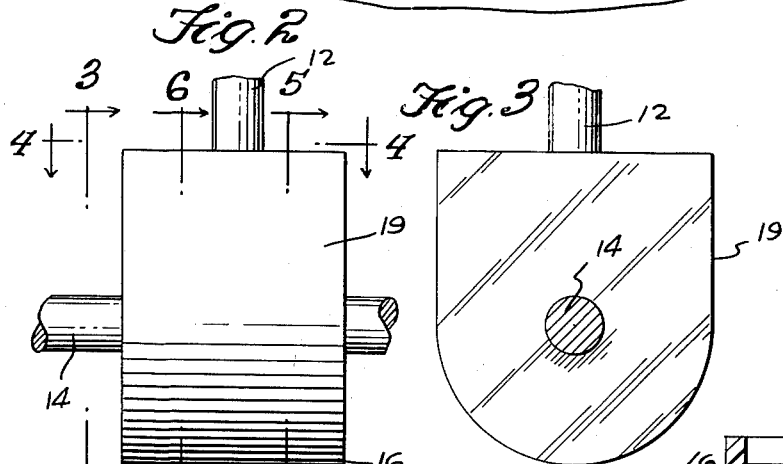
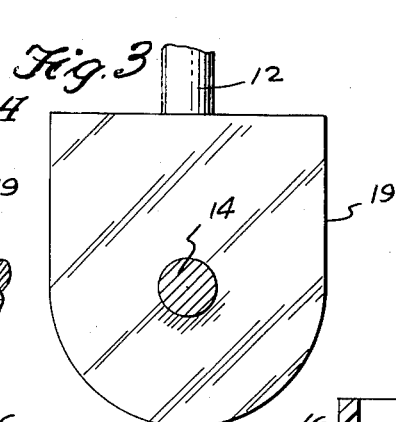
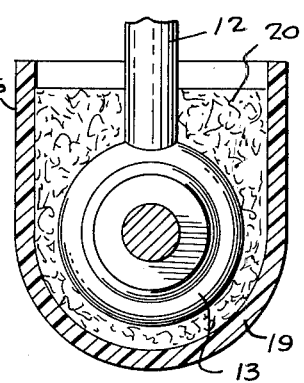
INVENTOR.
CARMINE M. RUSSO
BY
McMorrow, Berman & Davidson
ATTORNEYS

United States Patent Office 2,984,317
Patented May 16, 1961

2,984,317

OIL DRIP CUP FOR KNITTING MACHINES

Carmine M. Russo, 177 Forest Ave., Paramus, N.J.

Filed Aug. 7, 1959, Ser. No. 832,331

1 Claim. (Cl. 184—102)

This invention relates to lubrication devices, and more particularly to a protective device for use on lubricated bearings, such as the bearings employed in knitting machines, to keep the bearings properly lubricated and to prevent dripping of the lubricant from the bearings.

A main object of the invention is to provide a novel and improved oil drip cup assembly particularly useful on the bearings of knitting machines and similar apparatus to prevent dripping of oil or other lubricant from the bearings, whereby to prevent spoilage of the fabric produced by the machines, the assembly being relatively simple, involving only a few parts, and being easy to install.

A further object of the invention is to provide an improved oil drip cup for use on bearings, the cup involving relatively inexpensive components, being compact in size, and serving to prevent excessive loss of oil from the bearings with which they are employed and to prevent the oil from escaping from the region of the bearings.

Further objects and advantages of the invention will become apparent from the following description and claim, and from the accompanying drawings, wherein:

Figure 1 is a longitudinal vertical cross sectional view taken through one of the bearings of a knitting machine and showing an improved oil drip cup assembly according to the present invention installed on the bearing.

Figure 2 is an enlarged side elevational view of the drip cup assembly employed in Figure 1.

Figure 3 is a transverse vertical cross sectional view taken on the line 3—3 of Figure 2.

Figure 4 is a horizontal cross sectional view taken on the line 4—4 of Figure 2.

Figure 5 is a transverse vertical cross sectional view taken on the line 5—5 of Figure 2.

Figure 6 is a transverse vertical cross sectional view taken on the line 6—6 of Figure 2.

Referring to the drawings, 11 generally designates a knitting machine of conventional design which includes a depending rod element 12 suitably connected to the remainder of the machine and provided at its lower end with a generally annular supporting bearing 13 through which slidably extends a rod member 14 which reciprocates horizontally and is slidably supported by the bearing 13. As shown in Figure 1, the rod 14 is also slidably supported in upstanding bracket members 15 and 16, but the main support of the rod member is by the bearing 13, whereby the bearing requires lubrication in order to perform its intended function.

Designated at 16 is a cup-shaped housing member which surrounds the supporting bearing 13 and the portion of the shaft member engaged therewith, the cup member 16 being open at its top end, as shown, and comprising the respective vertical opposite end walls 17 and 18 and a generally U-shaped transverse wall portion 19 which connects the edges of the end wall portions 17 and 18. The housing member 16 is preferably made of plastic material, and preferably transparent plastic material of a composition which is resistant to oil.

The opposite end wall portions 17 and 18 are formed with suitable apertures through which the rod member 14 slidably extends, and interposed between the inside surfaces of the transverse end wall portions 17 and 18 and the bearing 13 are the respective porous deformable sealing pad members 20, 20 which may comprise felt pads which are substantially coextensive in area with the respective vertical end wall members 17 and 18. The felt pads surround the shaft member 14 and are substantially in sealing engagement therewith although allowing the rod member to slide freely.

Disposed in the cup-like housing member 16 is a quantity of liquid lubricant 21, such as lubricating oil, which is in contact with and saturates the felt pads 20, 20, whereby the portions of the shaft 14 adjacent the bearing 13 are continuously supplied with oil. Thus, the shaft member 14 is continuously lubricated and is slidably supported by the bearing 13 and the fixed hanger rod 12 so that it may reciprocate smoothly and without any appreciable wear.

As will be readily apparent, the protective housing member 16 keeps the oil 21 close to the bearing 13 and the assembly prevents dripping of the oil so that damage to the fabric produced by the machine by such dripping is completely avoided.

While a specific embodiment of an improved drip cup assembly for use on knitting machines and on bearings associated with other machines has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a knitting machine, a depending vertical rod element, an annular depending vertical supporting bearing secured to the lower end of said rod elements, a horizontal shaft extending slidably through and reciprocating horizontally in said bearing, a cup-shaped housing member surrounding said supporting bearing on the portion of the shaft engaged therewith, said housing member having respective vertical opposite end wall portions through which the shaft slidably extends, and a generally U-shaped transverse wall connecting the edges of said vertical end wall portions, respective deformable porous vertical sealing pads disposed in said housing member around the shaft and engaging between said annular supporting bearing and said end wall portions and being substantially coextensive in area with said end wall portions, and a quantity of liquid lubricant disposed in said cup-shaped housing member in contact with said pads.

References Cited in the file of this patent

UNITED STATES PATENTS

| | | |
|---|---|---|
| 1,668,976 | Peet et al. | May 8, 1928 |
| 2,053,705 | Durnell et al. | Sept. 8, 1936 |